United States Patent [19]

Kambe et al.

[11] 4,166,898

[45] Sep. 4, 1979

[54] PROCESS FOR PRODUCING COPOLYMER HAVING CARBONATE LINKAGES

[75] Inventors: Masaki Kambe, Fujisawa; Tadamichi Takada, Yokohama; Nobuyuki Miyazaki; Masanori Yokokawa, both of Fujisawa; Shohei Inoue, Tokyo, all of Japan

[73] Assignee: Nippon Oil Seal Industry Company Ltd., Tokyo, Japan

[21] Appl. No.: 740,918

[22] Filed: Nov. 11, 1976

Related U.S. Application Data

[63] Continuation of Ser. No. 527,919, Nov. 27, 1974, abandoned.

[30] Foreign Application Priority Data

Mar. 18, 1974 [JP] Japan .................................. 49-30099
Mar. 18, 1974 [JP] Japan .................................. 49-30100

[51] Int. Cl.$^2$ ...................... C08G 63/62; C08G 65/26
[52] U.S. Cl. ..................................... 528/405; 528/413
[58] Field of Search .......... 260/2 BP, 77.5 D, 665 R, 260/665 G; 528/405, 413

[56] References Cited

U.S. PATENT DOCUMENTS

| | | | |
|---|---|---|---|
| 3,585,168 | 6/1971 | Inoue et al. | 260/77.5 D |
| 3,706,809 | 12/1972 | Moroe et al. | 260/665 R |
| 3,953,383 | 4/1976 | Inoue et al. | 260/2 BP |

Primary Examiner—Wilbert J. Briggs, Sr.
Attorney, Agent, or Firm—Fred Philpitt

[57] ABSTRACT

A copolymer having carbonate linkages is produced by copolymerizing an epoxy compound with carbon dioxide in the presence of an isoprene-magnesium complex compound or a reaction mixture of said complex compound with an active hydrogen compound as a catalyst. The catalyst has a much improved polymerization activity when treated with carbon dioxide in advance.

8 Claims, No Drawings

PROCESS FOR PRODUCING COPOLYMER HAVING CARBONATE LINKAGES

This is a continuation of application Ser. No. 527,919, filed Nov. 27, 1974, now abandoned.

This invention relates to a process for producing a copolymer having carbonate linkages, and more particularly to a process for producing a copolymer having carbonate linkages, which comprises copolymerizing an epoxy compound with carbon dioxide.

It is well known that copolymer having carbonate linkages is produced by copolymerization reaction of an epoxy compound with carbon dioxide. That is, a process based on the use of organometallic compounds of metals of Group I to III as a catalyst is disclosed in U.S. Pat. No. 3,585,168, issued June 15, 1971 to Inoue et al.; a process based on the use of organometallic compounds of metals of Group II or aluminum is disclosed in Japanese Patent Publication No. 29,600/1972 disclosing the invention corresponding to said U.S. Patent; a process based on the use of a catalyst prepared by treating an organometallic compound of metals of Group II or III and water with a carbon dioxide gas under pressure is disclosed in Japanese Laid-open Patent Specification No. 68,695/1973. Desired copolymer having the carbonate linkages can be obtained according to any of these prior art processes, but the organometallic compounds used as a catalyst or as a main component of the catalyst are very hazardous or are not ready to produce. Therefore, it is not so desirous, in view of safety of operation, to use such catalysts and also the catalysts themselves are very expensive.

An object of the present invention is to provide a hazardless and cheap catalyst for copolymerizing an epoxy compound with carbon dioxide, which can assure smooth polymerization reaction. The present inventors have found that the object of the present invention can be attained by using an 1,3-diene-magnesium complex compound as a catalyst or a main component for the catalyst for copolymerization reaction of an epoxy compound with carbon dioxide in place of the so far employed organometallic compounds.

Thus, the present invention relates to a process for producing a copolymer having carbonate linkages, where the copolymer is produced by copolymerizing an epoxy compound with carbon dioxide, using an 1,3-diene-magnesium complex compound or a catalyst prepared from said complex compound and an active hydrogen compound as a catalyst.

It is known that 1,3-diene-magnesium complex compounds used as a catalyst or as a main component for the catalyst in the present invention can be readily prepared by reacting 1,3-dienes such as butadiene and its alkyl, dialkyl, alkenyl or aryl derivatives and 1,3-cycloalkadiene, for example, isoprene, 2,3-dimethylbutadiene, 2-ethylbutadiene, 2-n-propylbutadiene, 2-isopropylbutadiene, 2-n-butylbutadiene, 2-vinylbutadiene, 2-phenylbutadiene, 1,3-pentadiene, 1,3-cyclohexadiene and the like, with metallic magnesium in the presence of various catalysts, for example, organohalogen compound such as alkyl halides and aryl halides, Lewis acids such as boron trifluoride, palladium chloride, ferric chloride, zinc chloride and aluminum chloride or combinations of these Lewis acids with a reducing agent such as metal hydride, Grignard's reagent and the like, in a solvent such as tetrahydrofuran at room temperature to under a reflux condition, and that these complex compound are safe (for example, see Tetrahedron Letters No. 44, pages 3843-3846, 1970).

The molar ration of 1,3-diene to magnesium may vary widely and is not critical. The 1,3-diene-magnesium complex compounds are obtained as 1:1 complex compounds of 1,3-diene monomer, dimer, trimer and the like with magnesium, or a mixture of these complex compounds comprising mainly of complex compound with the 1,3-diene monomer, depending upon reaction conditions such as kinds of 1,3-dienes used, molar ratio of 1,3-dienes to metallic magnesium. For example, when isoprene is used as 1,3-diene, it is assumed that 1:1 complex compounds of isoprene monomer or dimer with magnesium would have the following structure (see Tetrahedron Letters No. 38, pages 3529-3532, 1971; The 153th National Meeting of American Chemical Society 1967, Abstracts pages 0-41):

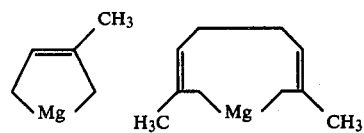

When these 1,3-diene-magnesium complex compound or their mixture are used as a copolymerization catalyst, it is possible to use a reaction mixture in a solution state or a suspension state containing precipitates directly without isolating the complex compounds.

1,3-diene-magnesium complex compound can be used alone as the copolymerization catalyst, but also can be used as a main component for a catalyst prepared together with various inorganic or organic active hydrogen compounds as cocatalyst component. When the active hydrogen compound is used as cocatalyst component, any of inorganic and organic active hydrogen compounds can be employed. Examples of the inorganic active hydrogen compound include water, ammonia, hydrazine and the like. Examples of the organic active hydrogen compound include alcohols such as methanol, ethanol, ethylene glycol and 1,4-butanediol, ketones such as acetone, methylethylketone and acetylacetone, aldehydes such as acetaldehyde and propionaldehyde, aliphatic or aromatic carboxylic acids such as oxalic acid, phthalic acid, isophthalic acid and terephthalic acid, alkylamines such as monoethylamine and dimethylamine, alkylene amines such as ethylene diamine, cyclic alkylene amines such as piperazine and piperidine, aromatic amines such as anilne, esters such as methyl malonate, acid amides such as acetic acid amide, nitriles such as acetonitrile, nitro compounds such as nitromethane and nitroethane, and phenols such as phenol, resorcinol, o-hydroxybenzoic acid, p-hydroxybenzoic acid and hydroquinone and particularly alkylamines, alkylene amines, cyclic alkylene amines, phenols and aromatic carboxylic acids are used as preferable organic active hydrogen compounds. Furthermore, it is possible to use two or more of these inorganic or organic active hydrogen compounds at the same time.

These active hydrogen compounds are used in a molar ratio) of 0.01 to 5, preferably 0.1 to 2 to magnesium in the complex compound. Preparation of a catalyst can be carried out without using any fresh solvent at the preparation stage, but generally it is preferable and operationally safe to use a solvent common to the solvent for the copolymerization reaction. Any solvent can be used, so long as the solvent is an inert organic solvent. For example, aliphatic hydrocarbons, aromatic hydrocarbons, halogenated hydrocarbons, ethers, esters and carbonate are used. Examples of the solvent include n-hexane, cyclohexane, benzene, toluene, diethyl ether, ethyl isopropyl ether, tetrahydrofuran, dioxane, ethylene carbonate and diethyl carbonate. The catalysts prepared using these solvents have different activities, depending also upon the kinds of the solvents used. In order to obtain water- or acetone-insoluble copolymer (polyethylene carbonate) or methanol-insoluble copolymers (polycarbonates other than polyethylene carbonate) in high yield, it is desirable to prepare catalysts, using cyclic ethers such as dioxane as the solvent.

In order to enhence the yield of the resulting copolymer and a ratio of alternate copolymer in the copolymers, it is effective in the preparation of catalysts to treat the magnesium complex compound or a catalyst prepared from the magnesium complex compound and the active hydrogen compound with a carbon dioxide gas under pressure in advance. This treatment is carried out by exposing a magnesium complex compound or a mixture of the magnesium complex compound and an active hydrogen compound to an inert gas such as nitrogen, argon, helium and the like or a carbon dioxide gas, adding at least an equimolar amount of carbon dioxide in a gaseous, liquid or solid state, on the basis of magnesium in the complex compound, thereto, when carbon dioxide is brought into a vaporized state, so as to form a system showing generally a pressure of at least 0.1 kg/cm$^2$ gage, preferably about 5 to 60 kg/cm$^2$ gage, at room temperature, and treating the system at a temperature of from room temperature to about 200° C. for about 0.5 to 40 hours with stirring. In that treatment, the complex compound may be kept in a system of carbon dioxide gas under pressure at a temperature of from room temperature to about 150° C. for about 0.5 to 40 hours in advance, then admixed with predetermined active hydrogen compound, and then treated in the same manner as described above. Or, the complex compound and the active hydrogen compound may be reacted with each other at a temperature of from room temperature to about 150° C. for about 0.5 to 150 hours without the presence of carbon dioxide, and then admixed with carbon dioxide and treated in the same manner as described above. In that case, the reaction of the complex compound with the active hydrogen compound can be carried out at two temperature stages of room temperature and about 50° to150° C.

In the present invention, copolymerization reaction of an epoxy compound with carbon dioxide can be carried out safely and smoothly according to the so far employed copolymerization procedure by using any of (1) a catalyst of 1,3-diene-magnesium complex compound, (2) a catalyst prepared from the complex compound and an active hydrogen compound, (3) a catalyst prepared by treating the complex compound with a carbon dioxide gas under pressure and (4) a catalyst prepared by treating the complex compound and the active hydrogen compound with a carbon dioxide gas under pressure.

Examples of epoxy compound for comonomer include alkylene oxides such as ethylene oxide, propylene oxide, 1-butene oxide, 2-butene oxide and isobutylene oxide, conjugated diene oxides such as butadiene monoxide and butadiene dioxide, arylalkylene oxides such as styrene oxide, cycloalkylene oxides such as cyclohexene oxide and 4-vinylcyclohexene monoxide, glycidyl esters such as glycidyl acrylate and glycidyl methacrylate, glycidyl ethers such as methyl glycidyl ether, phenyl glycidyl ether and allyl glycidyl ether, halogenoalkylene oxides such as epichlorohydrin and epibromohydrin, dicyclopentadiene oxides such as dicyclopentadiene monoxide and dicyclopentadiene dioxide and their mixtures.

The catalyst for copolymerization reaction is used generally in a molar ratio of at least 0.0001, preferably 0.001 to 0.2, on the basis of the magnesium complex compound, to the epoxy compound. The higher the ratio, the higher the rate of polymerization reaction is obtained, However, the use in excessive ratio is not economically preferable. The polymerization reaction is carried out by adding an epoxy compound and a carbon dioxide gas to a reactor containing a catalyst solution, and effecting the polymerization at a reaction temperature of from 0° to 150° C., preferably from room temperature to about 70° C. under atmospheric pressure or generally under pressure of carbon dioxide gas of less than about 100 kg/cm$^2$.

After the completion of copolymerization reaction, the following treatment is carried out. In the case ethylene oxide is used as an epoxy compound, the resulting reaction mixture is put into water, and the precipitated products are dissolved in chloroform. The resulting chloroform solution is washed with dilute hydrochloric acid to remove the catalyst residues, and then washed with water and distilled to distill off chloroform. By these separating operations, water-insoluble copolymer showing a rubber-like elasticity, which are different from homopolymer of ethylene oxide of copolymers consisting mainly of ethylene oxide can be obtained. In order to further purify these copolymers, the copolymers are dissolved in a copolymer-soluble solvent such as chloroform, dichloromethane and the like, and the resulting solution is put into acetone to precipitate copolymer. Since polyethylene carbonate, alternate copolymer of ethylene oxide and carbon dioxide, is insoluble in acetone, the copolymer can be completely separated from acetone-soluble copolymers containing polyether linkages or low molecular weight products by the precipitation in acetone. On the other hand, water-soluble products are recovered by chloroform extraction-vaporization to dryness from the aqueous solution resulting from the precipitation of water-insoluble product by putting the reaction mixture into water, and the dilute hydrochloric acid and water used in washing.

When other epoxy compounds than ethylene oxide is used as an epoxy compound, the resulting reaction product is dissolved in a solvent such as chloroform, dichloromethane, benzene and the like, and washed with dilute hydrochloric acid and then with water to remove catalyst residues. Then, the solution is put into methanol to precipitate methanol-insoluble product, and the methanol-insoluble product is separated from the methanol-soluble products thereby.

It is confirmed by the presence of absorption showing carbonate linkages at 1750 cm$^{-1}$ by infrared absorption spectra that all the resulting products are copolymers. Furthermore, it is confirmed, for example, by elemental analysis of acetone-insoluble copolymer in the ethylene oxide copolymers and confirmation of its composition ratio that, when at least an equimolar amount of carbon dioxide is used as other comonomer for the epoxy compound, the epoxy compound and carbon dioxide are alternately copolymerized.

Having now described the invention, the following examples will further serve to illustrate the process. However, no limitations, other than those in the claims appended hereto, are to be implied since modifications and variations of these examples will be obvious to those skilled in the art.

EXAMPLE 1

(Complex compound catalyst)

0.75 moles of sufficiently dried metallic magnesium was reacted with 0.5 moles of isoprene in tetrahydrofuran, using 0.025 moles of zinc chloride and 0.025 moles of methyl magnesium iodide as catalysts in an argon gas atmosphere under a reflux condition for 4 hours, and after the completion of reaction, resulting precipitates were removed.

70 ml of the resulting tetrahydrofuran solution of isoprene-magnesium complex compound thus prepared (containing 7.6 milligram-atoms of magnesium) was put into a reaction vessel having a capacity of 200 ml. Then, such an amount of a carbon dioxide gas as to show a pressure of 40 kg/cm$^2$ at 50° C. and 40 ml (34.5 g) of propylene oxide were charged into the reaction vessel under pressure, and subjected to reaction at a temperature of 50° C. for 6 days with stirring. Then, the reaction mixture was put into methanol to discontinue the reaction.

Products precipitated in methanol were dissolved in benzene, washed with dilute hydrochloric acid to remove catalyst residues, and freeze-dried, whereby 0.65 g of methanol-insoluble copolymer in a white solid state was obtained. It was confirmed by infrared absorption spectrum determination that the resulting copolymer was polypropylene carbonate. On the other hand, methanol was distilled off from the methanol solution, and the resulting residues were dissolved in benzene, washed with dilute hydrochloric acid to remove water-soluble portions, and freeze-dried, whereby 2.1 g of methanol-soluble copolymer was obtained. It was confirmed by infrared absorption spectrum determination that the copolymer was polypropylene carbonate containing polyether portions.

EXAMPLE 2

(Complex compound-ammonia catalyst)

70 ml of the tetrahydrofuran solution of isoprene-magnesium complex compound prepared in the same manner as in Example 1 (containing 36.5 milligram-atoms of magnesium) was put into a reaction vessel having a capacity of 200 ml. Then, 0.39 g of ammonia gas (molar ratio of NH$_3$/Mg: 0.67) was charged into the reaction vessel and subjected to reaction at 70° C. for 2 hours. Then, the reaction vessel was cooled to 50° C., and such an amount of a carbon dioxide gas as to show a pressure of 40 kg/cm$^2$ at 50° C. and 40 ml (34.5 g) of propylene oxide were charged to the reaction vessel under pressure, and subjected to reaction at 50° C. for 30 hours with stirring.

After the completion of reaction, the reaction mixture was treated in the same manner as in Example 1, whereby 0.28 g of methanol-insoluble copolymer was obtained. It was confirmed by infrared absorption spectrum determination that the copolymer was polypropylene carbonate.

EXAMPLE 3

(Complex compound-ethylene diamine catalyst)

28 ml of the tetrahydrofuran solution of isoprene-magnesium complex compound prepared in the same manner as in Example 1 (containing 36.8 milligram-atoms of magnesium) was put into a sufficiently dried reaction vessel having a capacity of 200 ml, and further 55 ml of tetrahydrofuran was added thereto. 1.02 g of ethylene diamine (17.3 millimoles; molar ratio of magnesium: 0.47) was added thereto with stirring, and reaction was carried out at room temperature for 2 hours. Then, such an amount of carbon dioxide gas as to show a pressure of 40 kg/cm$^2$ at 50° C. and 67 ml (1 mole) of propylene oxide were charged thereto under pressure, and reaction was carried out at 50° C. for 74 hours.

After the completion of reaction, the resulting reaction mixture was put into benzene, and the resulting benzene solution was sufficiently washed with dilute hydrochloric acid, and then with water to remove catalyst residues. The washed benzene solution was put into methanol, whereby 1.96 g of methanol-insoluble copolymer in a white solid state was obtained. It was confirmed by infrared absorption spectrum determination that the copolymer was polypropylene carbonate.

EXAMPLE 4

(Complex compound-piperazine catalyst)

14.1 ml of the tetrahydrofuran solution of isoprene-magnesium complex compound prepared in the same manner as in Example 1 (containing 20.7 milligram-atoms of magnesium) was put into a reaction vessel, and further 36 ml of tetrahydrofuran was added thereto. Then, 30 ml of a tetrahydrofuran solution containing 1.7 g of piperazine (19.7 millimoles; molar ratio to magnesium: 0.95) was added thereto, and reaction was carried out at 50° C. for 20 hours. Then, such an amount of carbon dioxide gas as to show a pressure of 30 kg/cm at 50° C. and 25 ml (0.5 moles) of ethylene oxide cooled to −60° C. were charged thereto under pressure, and reaction was carried out at 50° C. for 24 hours.

After the completion of the reaction, the resulting reaction mixture was put into water to precipitate water-insoluble product. The water-insoluble product was dissolved in chloroform, washed with dilute hydrochloric acid to remove catalyst residues, washed with water, and then freed from chloroform, whereby 0.5 g of water-insoluble copolymer was obtained. It was confirmed by infrared absorption spectrum determination that the copolymer was polyethylene carbonate.

EXAMPLE 5

(Complex compound-resorcinol catalyst)

70 ml of the tetrahydrofuran solution of isoprene-magnesium complex compound prepared in the same manner as in Example 1 (containing 14.5 milligram-atoms of magnesium) was put into a reaction vessel, and further 1.48 g of resorcinol (13.5 millimoles; molar ratio to magnesium: 0.93) was added thereto, and reaction was carried out at 70° C. for one hour. Then, the reaction vessel was cooled to 50° C., and such an amount of carbon dioxide gas as to show a pressure of 40 kg/cm$^2$ at 50° C. and 20 g (0.2 moles) of cyclohexene oxide were charged thereto under pressure, and reaction was carried out at 50° C. for 40 hours. After the completion of the reaction, the resulting reaction mixture was treated in the same manner as in Example 3, whereby 2.8 g of methanol-insoluble copolymer was obtained. It was confirmed by infrared absorption spectrum determination that the copolymer was polycyclohexene carbonate.

EXAMPLE 6

(Carbon dioxide-treated complex compound catalyst)

18 ml of the tetrahydrofuran solution of isoprene-magnesium complex compound prepared in the same manner as in Example 1 (containing 27.6 milligram-atoms of magnesium) was put into a reaction vessel having a capacity of 200 ml and containing 60 ml of tetrahydrofuran. Then, such an amount of carbon dioxide gas as to show a pressure of 10 kg/cm$^2$ at room temperature was charged thereto under pressure, and reaction was carried out at 50° C. for 2 hours with stirring. Then, 25 ml (22 g) of ethylene oxide cooled to −60° C., and such an amount of additional carbon dioxide gas as to show a pressure of 40 kg/cm$^2$ at 50° C. were charged thereto under pressure, and reaction was carried out for 40 hours. Then, the resulting reaction mixture was put into water to discontinue the reaction. Thereafter, treatment was carried out in the same manner as in Example 4, whereby 3.0 g of water-insoluble copolymer was obtained. It was confirmed by infrared absorption spectrum determination that the copolymer was polyethylene carbonate.

EXAMPLE 7

(Carbon dioxide-treated complex compound-ammonia catalyst)

70 ml of the tetrahydrofuran solution of isoprene-magnesium complex compound prepared in the same manner as in Example 1 (containing 32.9 milligram-atoms of magnesium) was put into a reaction vessel having a capacity of 200 ml. Then, 0.35 g of ammonia gas (molar ratio of NH$_3$/Mg: 0.67) was added to the reaction vessel, and reaction was carried out at 70° C. for one hour. Then, such an amount of carbon dioxide gas as to show a pressure of 40 kg/cm$^2$ at 70° C. was charged thereto under pressure, and reaction was carried out at 130° C. for 3 hours. Then, the reaction vessel was cooled to 50° C., and 67 ml (58.1 g) of propylene oxide was charged thereto under pressure, and then such an amount of additional carbon dioxide gas as to show a pressure of 40 kg/cm$^2$ at 50° C. was charged thereto under pressure. Reaction was carried out for 70 hours.

After the completion of the reaction, treatment was carried out in the same manner as in Example 1, whereby 10.3 g of methanol-insoluble copolymer (intrinsic viscosity 1.17; 30° C. in chloroform) was obtained. It was confirmed by infrared absorption spectrum determination that the copolymer was polypropylene carbonate.

EXAMPLE 8

(Carbon dioxide-treated, complex compound-water catalyst)

20 ml of the tetrahydrofuran solution of isoprene-magnesium complex compound prepared in the same manner as in Example 1 (containing 30.6 milligram-atoms of magnesium) was put into a reaction vessel having a capacity of 200 ml and containing 60 ml of dioxane. Then, 0.55 g of water (molar ratio of H$_2$O/Mg: 1.01) was put into the reaction vessel, and further such an amount of carbon dioxide gas as to show a pressure of 30 kg/cm$^3$ at room temperature was charged into the reaction vessel under pressure; and reaction was carried out at 100° C. for 3 hours with stirring. Then, the reaction vessel was cooled to 50° C., and then 50 ml (44 g) of ethylene oxide cooled to −60° C. was charged thereto under pressure. Then, such an amount of additional carbon dioxide gas as to show a pressure of 50 kg/cm$^2$ at 50° C. was charged thereto under pressure, and reaction was carried out for 45 hours. Then, the reaction mixture was put into water to discontinue the reaction. Thereafter, treatment was carried out in the same manner as in Example 4, whereby 4.2 g of water-insoluble copolymer was obtained. It was confirmed by infrared absorption spectrum determination that the copolymer was polyethylene carbonate.

EXAMPLE 9

(Carbon dioxide-treated, complex compound-piperazine catalyst)

10.5 ml of the tetrahydrofuran solution of isoprene-magnesium complex compound prepared in the same manner as in Example 1 (containing 6 milligram-atoms of magnesium) and 0.52 g of piperazine (6 millimoles) were mixed in 70 ml of tetrahydrofuran at room temperature for 30 minutes, and then the resulting catalyst solution was transferred to a reaction vessel having a capacity of 200 ml. The solution was heated at 70° C. for one hour, and then a carbon dioxide gas was charged thereto under pressure until there was established a pressure of 25 kg/cm$^2$ at 70° C. Then, temperature was elevated to 120° C., and reaction was carried out for 3 hours. After the completion of the reaction, the temperature of the reaction vessel was lowered to room temperature, and the pressure within the reaction vessel was slowly returned to the atomospheric pressure, whereby a catalyst solution was prepared.

Polymerization reaction was carried out by adding 40 ml of propylene oxide to the catalyst solution by a sprin̈ge, while passing a carbon dioxide gas through the catalyst solution, charging a carbon dioxide gas under pressure until there was established a pressure of 30 kg/cm$^2$ at room temperature, and conducting polymerization at 50° C. for 40 hours.

After the completion of the polymerization reaction, the resulting reaction mixture was put into a mixed solution of methanol-dilute hydrochloric acid to discontinue the polymerization reaction. The precipitated product was dissolved in benzene, washed with dilute hydrochloric acid to remove catalyst residues, and then freeze-dried, whereby 2.23 g of methanol-insoluble portion (intrinsic viscosity: 0.70; 30° C. in dioxane) was obtained. It was confirmed by infrared absorption spectrum determination that the methanol-insoluble portion was polypropylene carbonate. Further, it was confirmed by infrared absorption spectrum determination that methanol-soluble portions recovered from methanol were a mixture of polypropylene carbonate containing polyether portions and cyclic propylene carbonate.

EXAMPLE 10-13

(Carbon dioxide-treated, complex compound-organic active hydrogen compound catalyst)

The tetrahydrofuran solution of isoprene-magnesium complex compound prepared in the same manner as in Example 1 and various organic active hydrogen compounds were mixed in 70 ml of tetrahydrofuran or 50 ml of dioxane at room temperature for 30 minutes, and then the catalyst solutions were transferred to individual reaction vessels having capacities each of 200 ml. Then, treatment was carried out at 70°–80° C. for 0.5–1.5 hours (see first aging condition of catalyst in the following table), and then a carbon dioxide gas was charged thereto under pressure until there was established a pressure of 25 kg/cm² at 70°–80° C. Then, the temperature was elevated to 130° C., and reaction was carried out for 3 hours (second aging condition of catalyst).

After the completion of the reaction, the temperature of the reaction vessel was lowered to room temperature, and the pressure in the reaction vessels was slowly returned to the atomospheric pressure, whereby catalyst solutions were prepared.

Polymerization was carried out by adding 40 g of ethylene oxide cooled to about −60° C. or 27 g of epichlorohydrin to the catalyst solutions by syringes, while passing a carbon dioxide gas through the catalyst solutions, then charging a carbon dioxide gas thereto under pressure until there was established a pressure of 40–50 kg/cm² at room temperature, and conducting reaction at 50° C. for 40 hours.

In the polymerization reaction using ethylene oxide as an epoxy compound, the resulting reaction mixture was put into water to discontinue the reaction and precipitate a portion of the resulting products at the same time. The precipitated product was washed with dilute hydrochloric acid to remove catalyst residues, and then washed with water, whereby water-insoluble portion was obtained. It was confirmed from the presence of strong absorption at 1750, 1200–1300 and 785 cm$^{-1}$ due to the carbonate linkage and absence of absorption around 1100 cm$^{-1}$ due to polyether linkage by infrared absorption spectra that the water-insoluble portion is polyethylene carbonate. On the other hand, water-soluble portions were obtained from the aqueous solution by chloroform extraction, and it was confirmed by infrared absorption spectra that the water-soluble portions are a mixture of polyethylene carbonate containing polyether portions and cyclic ethylene carbonate.

In the polymerization reaction using epichlorohydrin as an epoxy compound, the resulting reaction mixture was put into a mixed solution of methanol-dilute hydrochloric acid to discontinue the reaction and remove catalyst residues at the same time, amd then the precipitated product was sufficiently washed with methanol, whereby methanol-insoluble portion was obtained. It was confirmed by infrared absorption spectra and elemental analytical value of chlorine of 25.8% (calculated: 26.0%) that the methanol-insoluble portion is 1:1 alternate copolymer with carbon dioxide.

The results are shown in the following table, where the amounts of complex compounds used are represented by milligram-atoms of magnesium obtained by measuring the amount of magnesium atoms in the isoprene-magnesium complex compound in the same manner as in the foregoing examples, and the molor ratio is a molar ratio of organic active hydrogen compound to magnesium.

TABLE

| Example | Epoxy Compound | Organic Active Hydrogen Compound Name | Organic Active Hydrogen Compound (g) | Amount of Complex Compound Used | Molar Ratio | First Aging Condition of Cat. | Solvent | Water-insoluble Portion (g) | Methanol-insoluble Portion (g) |
|---|---|---|---|---|---|---|---|---|---|
| 10 | Ethylene Oxide | Resorcinol | 1.32 | 14.5 | 0.83 | 80° C., 1hr. | Tetrahydrofuran | 3.25 | — |
| 11 | " | Piperazine | 2.10 | 25.8 | 0.95 | 70° C., 0.5hr. | Dioxane | 0.90 | — |
| 12 | " | Ethylene Diamine | 0.95 | 33.6 | 0.47 | 70° C., 1.5hr. | Tetrahydrofuran | 30.8 | — |
| 13 | Epichlorohydrin | Propyl Amine | 1.12 | 19.2 | 1.00 | 70° C., 1hr. | " | — | 3.00 |

What we claim is:

1. In the known process of producing copolymers having a carbonate linkage by copolymerizing an epoxy compound with carbon dioxide in the presence of a catalyst, the improvement which comprises:
   using as said catalyst a copolymerization catalyst consisting of a carbon dioxide treated isoprene-magnesium complex, and
   carrying out the catalytic copolymerization process at a temperature from room temperature to about 150° C. and under a pressure of from atmospheric pressure to about 100 kg/cm².

2. A process according to claim 1 wherein the carbon dioxide-treated isoprene-magnesium complex compound is a compound obtained by contacting an isoprene-magnesium complex compound with at least an equimolar amount of a carbon dioxide gas on the basis of magnesium in the complex compound at a temperature of from room temperature to about 200° C. for about 0.5 to 40 hours.

3. A process according to claim 1, wherein the epoxy compound is a compound selected from the group consisting of alkylene oxides, alkylalkylene oxides, halogenoalkylene oxides and cycloalkylene oxides.

4. In the known process of producing copolymers having a carbonate linkage by copolymerizing an epoxy compound with carbon dioxide in the presence of a catalyst, the improvement which comprises:
   using as said catalyst a carbon dioxide treated reaction mixture of an isoprene-magnesium complex with an active hydrogen compound, and
   carrying out the catalytic copolymerization process at a temperature from room temperature to about 150° C. and under a pressure of from atmospheric pressure to about 100 kg/cm².

5. A process according to claim 4 wherein the carbon dioxide-treated reaction mixture of the isoprene-magnesium complex compound with the active hydrogen compound is a mixture obtained by contacting an isoprene-magnesium complex compound and an active hydrogen compound with at least an equimolar amount of a carbon dioxide gas on the basis of magnesium in the complex compound at a temperature of from room temperature to about 200° C. for about 0.5 to 40 hours.

6. A process according to claim 4 wherein the active hydrogen compound is an inorganic active hydrogen compound selected from the group consisting of water, ammonia and hydrazine.

7. A process according to claim 4 wherein the active hydrogen compound is an organic active hydrogen compound selected from the group consisting of alkylamines, alkylene amines, cyclic alkylene amines, phenols and aromatic carboxylic acids.

8. A process according to claim 4 wherein the epoxy compound is a compound selected from the group consisting of alkylene oxides, arylalkylene oxides, halogenoalkylene oxides and cycloalkylene oxides.

* * * * *